United States Patent
Birenberg et al.

(12)

(10) Patent No.: US 10,353,493 B2
(45) Date of Patent: Jul. 16, 2019

(54) APPARATUS AND METHOD OF PEN DETECTION AT A DIGITIZER

(71) Applicant: Microsoft Technology Licensing, LLC, Redmond, WA (US)

(72) Inventors: Dmitry Birenberg, Rosh Ha Ayin (IL); Zvi Zmiri, Kdumin (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 245 days.

(21) Appl. No.: 15/282,899

(22) Filed: Sep. 30, 2016

(65) Prior Publication Data

US 2018/0095553 A1    Apr. 5, 2018

(51) Int. Cl.
   *G06F 3/038*   (2013.01)
   *G06F 3/041*   (2006.01)
   *G06F 3/0354*  (2013.01)
   *G06F 3/043*   (2006.01)

(52) U.S. Cl.
   CPC ........ *G06F 3/03545* (2013.01); *G06F 3/0416* (2013.01); *G06F 3/0433* (2013.01); *G06F 3/0383* (2013.01); *G06F 3/041* (2013.01); *G06F 3/0414* (2013.01); *G06F 2203/04106* (2013.01); *G06F 2203/04108* (2013.01)

(58) Field of Classification Search
   CPC .... G06F 3/03545; G06F 3/033; G06F 3/0354; G06F 3/0304; G06F 3/03; G06F 3/011; G06F 3/01; G06F 3/00; G06F 3/0383; G06F 3/041; G06F 3/047; G06F 3/0416; G06F 3/043; G06F 2203/04106; G06F 3/0433; G06F 2203/041; G06F 2203/00; G06F 2203/04108; G06F 3/0414

See application file for complete search history.

(56) References Cited

U.S. PATENT DOCUMENTS

| | | |
|---|---|---|
| 5,105,468 A | 4/1992 | Guyon et al. |
| 5,166,666 A | 11/1992 | Tanaka |
| 5,329,625 A | 7/1994 | Kannan et al. |
| 5,561,447 A | 10/1996 | Suzuki et al. |
| 5,631,670 A | 5/1997 | Tomiyoshi et al. |
| 5,880,411 A | 3/1999 | Gillespie et al. |
| 6,529,854 B2 | 3/2003 | Kida et al. |

(Continued)

FOREIGN PATENT DOCUMENTS

| | | | | |
|---|---|---|---|---|
| GB | 2466566 A | * | 6/2010 | ......... G06F 3/03545 |
| WO | WO-2014061020 A1 | * | 4/2014 | ............. G06F 3/044 |

(Continued)

OTHER PUBLICATIONS

Graziano, Dan, "Make sure you're using the S Pen correctly", Published on: Oct. 3, 2013 Available at: http://www.cnet.com/how-to/make-sure-youre-using-the-s-pen-correctly/.

*Primary Examiner* — Julie Anne Watko
(74) *Attorney, Agent, or Firm* — Arent Fox LLP

(57) ABSTRACT

Methods and devices for synchronizing a digitizer with a pen are disclosed. An example method describes detecting that the digitizer has lost tracking of the pen. The example method further includes the digitizer searching for a subsequent beacon from the pen based on at least a previous location of a previous beacon during a tracking mode of the digitizer. The digitizer synchronizes with the pen based on a subsequent location of the subsequent from the pen identified during the search.

20 Claims, 10 Drawing Sheets

(56) References Cited

U.S. PATENT DOCUMENTS

| | | |
|---|---|---|
| 8,481,872 B2 | 7/2013 | Zachut |
| 2004/0246240 A1 | 12/2004 | Kolmykov-Zotov et al. |
| 2013/0021272 A1* | 1/2013 | Wang .................... G06F 3/0416 345/173 |
| 2014/0204036 A1 | 7/2014 | Schillings et al. |
| 2014/0267075 A1 | 9/2014 | Shahparnia et al. |
| 2014/0313146 A1* | 10/2014 | Munechika ............ G06F 3/041 345/173 |
| 2014/0354555 A1* | 12/2014 | Shahparnia ......... G06F 3/03545 345/173 |
| 2015/0062021 A1 | 3/2015 | Skaljak et al. |
| 2015/0242047 A1 | 8/2015 | Zafiris |
| 2017/0060287 A1* | 3/2017 | Gasselin de Richebourg ............ G06F 3/0416 |

FOREIGN PATENT DOCUMENTS

| | | | |
|---|---|---|---|
| WO | WO-2014129753 A1 * | 8/2014 | ........... G06F 3/0416 |
| WO | 2016044807 A1 | 3/2016 | |

* cited by examiner

APPARATUS AND METHOD OF PEN DETECTION AT A DIGITIZER

BACKGROUND

The present implementations relate to a digitizer of a computer device, and more particularly, to techniques for performing fast pen detection at a digitizer.

Electromagnetic pens or styluses are known in the art for use and control of a digitizer. Position detection of the pen provides input to a computing device associated with the digitizer and is interpreted as user commands. Position detection is performed while the pen tip is either touching and/or hovering over a detection surface of the digitizer. Often, the digitizer is integrated with a display screen and a position of the pen over the screen is correlated with information portrayed on the screen.

A digitizer may operate in a search mode or a tracking mode. The digitizer operates in a search mode when there is no communication or contact with the pen, or the communication or contact with the pen is lost and the digitizer is searching for a transmission signal, such as a beacon, from the pen. Once the digitizer finds the transmission signal from the pen, the digitizer performs a synchronization with the pen and the digitizer transitions to a tracking mode. In the tracking mode, the digitizer is in synchronization with the transmission signal from the pen and can receive information from the pen.

However, the digitizer may lose contact with the pen during gestures and may get out of sync, i.e., lose synchronization. This may result in lost strokes from the pen which may affect the robustness (e.g., performance) of the digitizer. Therefore, there is a need for an improved pen detection at a digitizer of a computer device.

SUMMARY

The following presents a simplified summary of one or more disclosed features in order to provide a basic understanding of the disclosure. This summary is not an extensive overview of all contemplated implementations, and is intended to neither identify key or critical elements of all implementations nor delineate the scope of any or all implementations of the present disclosure. Its sole purpose is to present some concepts of one or more features of the present disclosure in a simplified form as a prelude to the more detailed description that is presented later.

One implementation relates to a method of synchronizing a digitizer with a pen. The method may include detecting, by the digitizer, that the digitizer has lost tracking of the pen; searching, by the digitizer in response to detecting that the digitizer lost tracking of the pen, for a subsequent beacon from the pen during a pen search window located within a touch cycle of the digitizer based on at least a previous location of a previous beacon during a tracking mode of the digitizer; and synchronizing the digitizer with the pen based on a subsequent location of the subsequent beacon from the pen identified during the search.

In another implementation, a digitizer for synchronizing with a pen may include a memory and a processor in communication with the memory, wherein the processor is configured to detect, by the digitizer, that the digitizer has lost tracking of the pen; search, by the digitizer in response to detecting that the digitizer lost tracking of the pen, for a subsequent beacon from the pen during a pen search window located within a touch cycle of the digitizer based on at least a previous location of a previous beacon during a tracking mode of the digitizer; and synchronize the digitizer with the pen based on a subsequent location of the subsequent beacon from the pen identified during the search.

In a further implementation, a computer-readable medium storing computer-executable instructions executable by a processor for synchronizing a digitizer with a pen includes various instructions. The computer-readable medium includes instructions for instructions for detecting, by the digitizer, that the digitizer has lost tracking of the pen; instructions for searching, by the digitizer, for a subsequent beacon from the pen during a pen search window located within a touch cycle of the digitizer based on at least a previous location of a previous beacon during a tracking mode of the digitizer; and instructions for synchronizing the digitizer with the pen based on a subsequent location of the subsequent beacon from the pen identified during the search.

Additional advantages and novel features relating to features of the present disclosure will be set forth in part in the description that follows, and in part will become more apparent to those skilled in the art upon examination of the following or upon learning by practice thereof.

DETAILED DESCRIPTION

The present disclosure provides a digitizer having a fast pen search mode for synchronizing a pen (also referred to as a stylus) with the digitizer. The digitizer performs a fast pen search technique after the digitizer loses contact with the pen. The digitizer performs the fast pen search by searching for a subsequent beacon from the pen in a pen search window that is located within a touch cycle of the digitizer based on at least a previous location of a previous beacon during a tracking mode of the digitizer. In the fast pen search mode, the digitizer may vary a location of the pen search window from one touch cycle to another, and/or not include any pen search window, depending on an expected occurrence of subsequent beacon from the pen based on information the digitizer obtains from the pen tracking mode.

For example, the digitizer performs the fast pen search by aligning a first pen search window in a first touch cycle in the fast pen search mode with an expected location of a first subsequent beacon from the pen, aligning a second pen search window in a second touch cycle with an expected location of a second subsequent beacon from the pen, and so on.

In some implementations, the digitizer operating in the fast pen search mode as described herein may more efficiently and more quickly detect and synchronize with the pen. This may lead to less loss of user commands, e.g., pen strokes, after the digitizer has lost track of the pen, and can improve user satisfaction, e.g., by providing the performance and feel of physically writing on paper.

Figure 1:
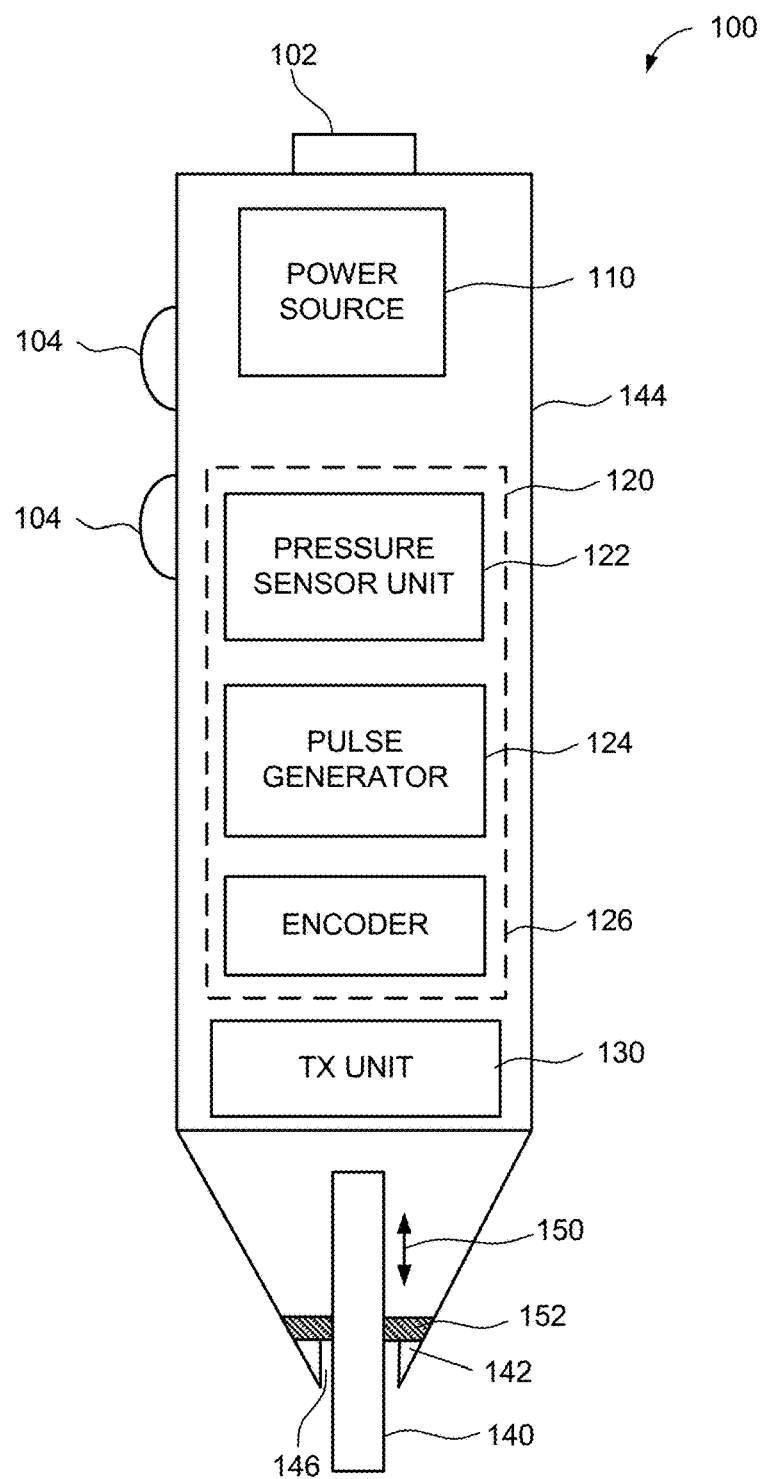
FIG. 1 is a schematic view of an example of a pen.

Referring to FIG. 1, according to an example implementation, a pen 100 (which may also be referred to as a stylus) may be an autonomous asynchronous device that can be tracked by a digitizer that can perform a fast pen search mode as described herein. Pen 100 can transmit pulses of energy that can represent beacon signals and/or commands generated by pen 100. For example, pen 100 may transmit an electric signal generated by a pulse generator 124 with a transmitting unit 130. In some cases, pulse generator 124 generates one or more AC signal bursts providing pulsed signals (AC pulses), e.g., a train of pulses (signal bursts). For example, the AC pulses may be generated within a certain frequency range, such as but not limited to a frequency range between 20-40 KHz. The AC pulses may use a frequency other than the frequencies generally used to detect finger touch on a digitizer. Additionally, for example, the frequency of a burst signal from pen 100 may be orthogonal to the frequencies used to detect finger touch in the sampling space or far enough away so that simultaneous user interactions (e.g., pen and finger) may be possible. Also, in some implementations, specific time slots for finger touch detection and pen detection may be defined to avoid interference or misidentification when close frequencies are used. In some cases, pulse generator 124 generates pulses over a defined time duration or pulse width. An example pulse width may be between 1-2 msec, such as but not limited to 1.28 msec.

Pen 100 may be powered by power source 110. The power source 110 may include one or more batteries, e.g., alkaline or re-chargeable batteries. Further, a voltage stabilizer may be included in pen 100 to stabilize the voltage from power source 110.

In some cases, pen 100 may include a power switch 102 for powering transmission of pen 100 and one or more operational switches and/or dials 104 for receiving operation commands from a user. For instance, switches 104 may control right click and eraser mode commands as well as color selection when writing or drawing with the pen. In some other additional or optional implementations, a rocker switch may be used for right click or eraser operation. That is, at least one of switches 104 may be a rocker switch.

Pen 100 may include tip 140 that operates as an antenna of transmission unit 130 and/or an electric dipole. For example, one output of pulse generator 124 is electrically connected to pen tip 140 (which may be constructed from a conductive material) while the other end is electrically connected to a frame 142 (which may comprise conductive material) surrounding tip 140. The frame 142 may be integral to housing unit 144 and is grounded. An electric field, synchronized to a generated signal pulse, may be formed in a small gap 146 located between the tip 140 and the frame 142. In some implementations, the geometric dimensions of the gap and the consequent electric field may be relatively small so that field source may be substantially close to the pen tip and may provide a concentrated signal at the tip. Further, the signals transmitted by pen 100 may be picked up at relatively concentrated points by a digitizer or other sensing surface and the position of the pen at that position may be conveyed to the digitizer. In some other optional implementations, pen 100 may include a separate antenna and may not use tip 140 for transmitting the output signals.

Pen 100 may be a pressure sensitive pen that may transmit information regarding contact pressure applied to tip 140. In some additional or optional cases, tip 140 recedes into housing unit 144 in an axial direction 150 in response to the applied contact pressure by a user operating the pen 100, e.g., by pressing the tip 140 on a surface and is subsequently released when the contact pressure is released, e.g., a hovering state or non-operational state of the pen. In some cases, during the axial movement, tip 140 is engaged with a resilient element 152, e.g., a spring whose properties are generally selected to obtain a desired relationship between the contact pressure and the axial displacement.

In some other implementations, a pressure sensor unit 122 senses contact pressure applied to tip 140 and based on the sensed contact pressure level, a frequency of a pulse generated by a pulse generator 124 is altered and/or defined. In some other additional or optional cases, a specific frequency band may be allocated for transmitting the pressure information. For example, a frequency band of 20-45 KHz, e.g., 20-25 KHz, may be allocated for transmitting the pressure information. Additionally, output from the pressure sensor unit 122 may be encoded with an encoder 126 for the pulses generated by pulse generator 124.

Pen 100 may include an encoder 126, such as but not limited to a digital encoder, operable to encode an operational state of pen 100 and/or identification information of pen 100 into a pulse generated by pulse generator 124. The operational state of pen 100 may be obtained from switch state of switches 102, and/or the pressure state of the pen may be encoded with encoder 126. One or more encoding methods (e.g., Amplitude Shift Keying (ASK), Phase Shift Keying (PSK), Frequency Shift Keying (FSK), etc.) may be used to encode information with encoder 126. The encoded information from the pen may be transmitted over a plurality of transmission cycles. For instance, in some implementations, one bit of encoded information may be transmitted per transmission cycle. In some other implementations, pulse generator 124, encoder 126, pressure sensor unit 122, and/or their functionality may be embedded in an ASIC unit 120.

In some cases, a time between pulses may match a refresh cycle of a digitizer or an integer multiple of a refresh cycle of a digitizer, e.g., twice a refresh cycle of a digitizer and/or three or four times a refresh frequency of a digitizer. Alternatively or in addition, a time between pulses (or bursts) may be variable and may be controllably altered based on an operational state of the digitizer. For instance, in an implementation, the time between pulses at the pen 100 may be configured for 15 msec.

Figure 2:
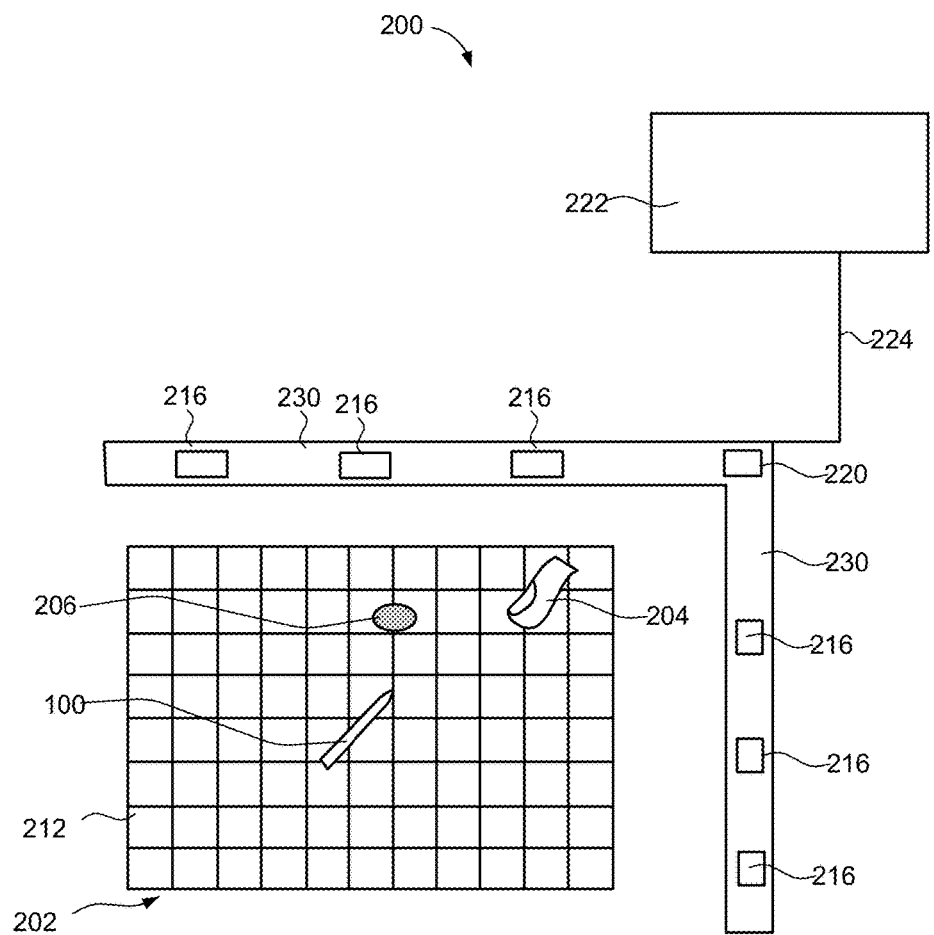
FIG. 2 is a schematic view of an example of a digitizer system for use with the pen of FIG. 1.

Referring to FIG. 2, according to an example implementation, a digitizer system or digitizer 200 may be used with any computing device to enable interactions between a user and a device, e.g., personal computers (PCs), tablets, pen enabled laptop computers, PDAs, mobile devices/user equipments (UEs), etc. In some implementations, the digitizer system 200 is part of a user interface operative to detect inputs from one or more pens 100, fingers 204, and/or conductive objects 206. Digitizer 200 may operate in a pen search mode or a pen tracking mode. In a pen search mode, such as initial pen search mode or a fast pen search mode as described herein, digitizer 200 may search for a signal from the pen 100, perform synchronization with the signal transmitted from the pen 100 when the signal from the pen 100 is detected or when the pen 100 comes in contact with the digitizer 200, and/or enter the tracking mode upon successful completion of the synchronization with the pen 100. The digitizer 200 remains in the tracking mode while the pen 100 maintains contact with the digitizer 200 or continues to receive the signal from the pen 100.

Digitizer system 200 may include a sensor 212 including a patterned arrangement of conductive lines (sensor lines), which may be optionally transparent, and which are typically overlaid on a display 202. For example, sensor 212 may be a grid based sensor including horizontal and vertical lines. In some cases, a width of the conductive line may vary over its length, e.g., the width of the conductive line may be narrower around the vicinity of junction points of the grid and wider between the junction points. In some cases, the conductive lines may be shaped like a diamond shape array with diamond points matched to junction points. In some implementations, the parallel conductive lines are equally spaced straight lines, and are input to amplifiers included in application specific integrated circuit (ASIC) 216. For example, the amplifiers may be differential amplifiers.

ASIC 216 includes, for example, circuitry to process and sample an output of the sensor and generate a digital representation. The digital output signal is forwarded to a digital unit 220, e.g., a digital ASIC unit, for further digital processing. For instance, digital unit 220 together with ASIC 216 may serve as a controller of the digitizer system 200 and/or may have the functionality of a controller and/or a processor. In some cases, a single unit may be used, e.g., in a small screen with limited number of lines. In some other additional or optional implementations, ASIC 216 operates as a detection unit for processing and sampling the output of the sensor. The outcome, once determined, is forwarded to a host 222, e.g., a computer device or a host computer device, via an interface 224 for processing by the operating system or any current application. In some other cases, control functionality may be additionally or exclusively included in the host 222, and ASIC 216 and digital unit 220 may be provided as a single ASIC. In some other optional implementations, digital unit 220 and ASICs 216 may be mounted in a PCB 230.

ASIC 216 may be connected to the outputs of the various conductive lines in the grid and functions to process the received signals at a first processing stage. In some cases, instead of a PCB 230 positioned along two sides of sensor 212, a flex cable may be used to connect the conductive lines to ASICs 216, e.g., positioned away from a sensing surface of digitizer 200. As indicated above, ASIC 216 may include one or more arrays of amplifiers, e.g., an array of differential amplifiers, an array of single ended amplifiers, or any array of differential amplifiers, and optionally including one grounded input to amplify the sensor's signals. In some other additional or optional implementations, the grounding input may be selected by ASIC 216. ASIC 216 may optionally include one or more filters to remove irrelevant frequencies. Additionally, filtering is performed prior to sampling. The signal is then sampled by an A/D, optionally filtered by a digital filter and forwarded to digital ASIC unit, for further digital processing. Alternatively, the optional filtering is fully digital or fully analog.

For instance, digital unit 220 receives the sampled data from ASIC 216, reads the sampled data, processes it and determines and/or tracks the position of physical objects, such as pen 100 and/or finger 204, touching the digitizer sensor 212. Further, for example, digital unit 220 is operative to decode information encoded in a transmission signal from pen 100, e.g., pressure on tip, right-click and/or eraser mode, color for tracing, and identification, etc. According to some implementations, hovering of an object, e.g., pen 100, finger 204 and/or hand, may be detected and processed by digital unit 220. In any case, digital unit 220 can send a calculated position to the host 222 via interface 224.

In some implementations, digitizer system or digitizer 200 has several channels, i.e., interfaces included within interface 224, with the host. In an example, interface 224 includes a pen interface for transmitting pen coordinates on the display screen, and a finger touch interface for transmitting finger touch coordinates on the display screen. In some additional examples, a same interface of interface 224 may transmit finger touch coordinates based on both single touch detection method and multi-touch detection method. Optionally, the interface 224 may transmit information on detected gestures.

Further, digital unit 220 may be operative to control operation of one or more ASIC(s) 216. For instance, digital unit 220 may be operative to provide a command signal to ASIC 216 to switch between a plurality of available circuit paths (two or more) to connect to outputs of the various conductive lines in the grid. In some cases, digital unit 220 together with ASIC 216 provides for alternately connecting outputs of the various conductors to one of an array of differential amplifiers and an array of single ended amplifiers (or differential amplifiers with one grounded input). In other cases, digital unit 220 may be operative to control triggering of one or more conductive lines. In other examples, ASIC 216 together with digital unit 220 provide for triggering various conductors with an oscillating signal having a selected pre-defined frequency or frequencies.

Digital unit 220 may include at least a memory unit and a processing unit to store and process information obtained from ASIC 216. Memory and processing capability are also generally included in host 222 and ASIC 126. According to some implementations, memory and processing functionality may be divided between any combination of host 222, digital unit 220, and/or ASIC 216.

Figure 3:
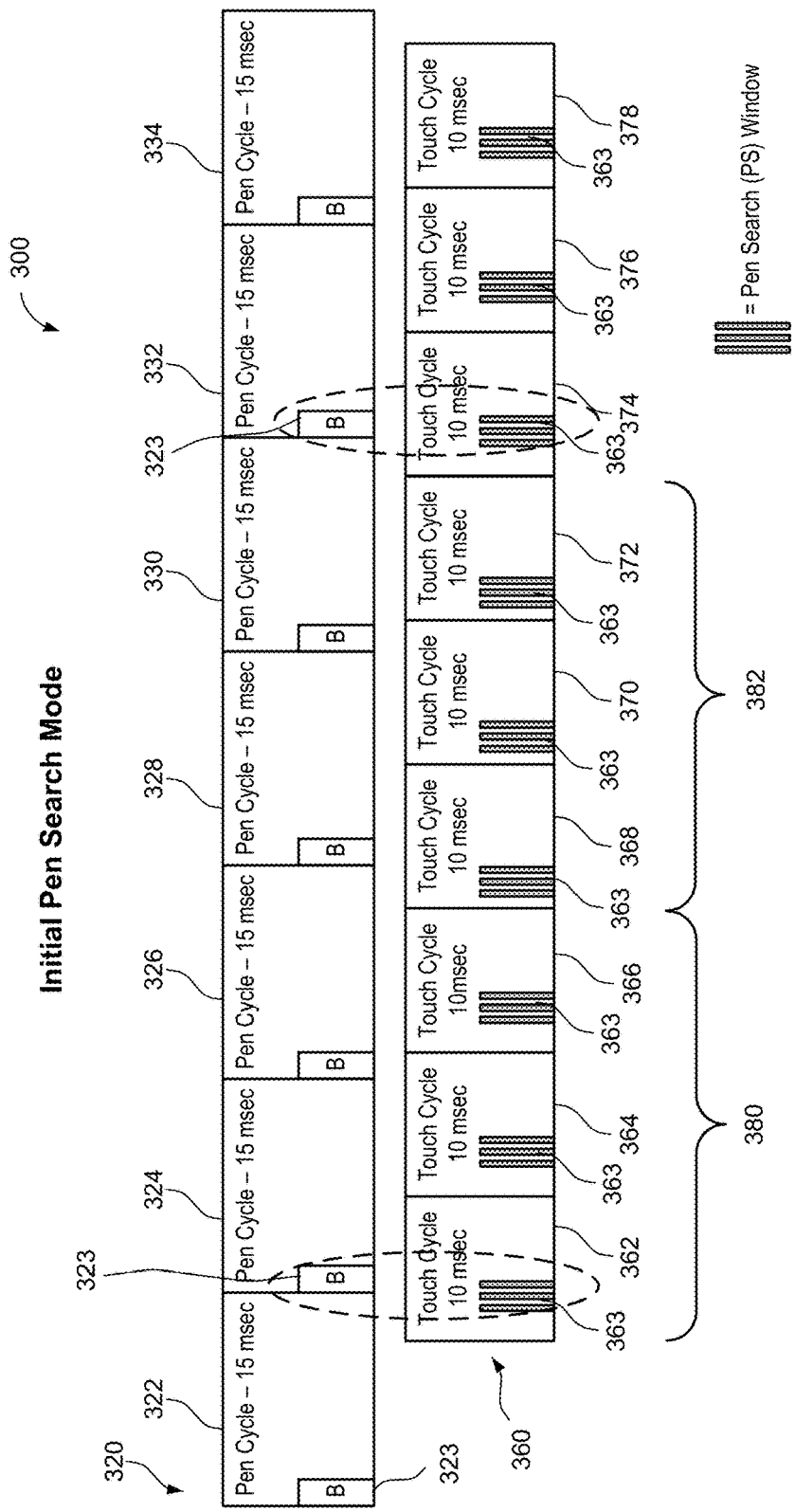
FIG. 3 is a block diagram of a pen cycle of the pen of FIG. 1 and a corresponding touch cycle of the digitizer of FIG. 2 over time for an example of the digitizer searching for a beacon transmitted by the pen.

Referring to FIG. 3, an example initial pen search mode 300 of digitizer 200 includes one or more pen search window configurations within different sets of digitizer touch cycles 360 to enable digitizer 200 to search for a transmission signal, a beacon, or a beacon pulse (referred to as "beacon") transmitted from the pen within one or more pen cycles 320. The initial pen search mode may be a mode used by digitizer 200 to search for pen 100, for example, when digitizer is initially turned on and/or the initial pen search mode may be activated after a certain amount of time has elapsed after losing tracking of the pen 100. Further, for example, one or more pen search window configurations within different sets of digitizer touch cycles 360 may include pen search windows positioned within different locations within one respective set of touch cycles as compared to a next respective set of touch cycles. The initial pen search mode may vary the location of the pen search window(s) within different sets of touch cycles in order to cover multiple possible periodic pen transmissions, as digitizer 200 does not know a transmission period of such pen transmissions and also does not know where the beginning or end of the pen cycle may be.

For example, pen 100 may operate according to a series of pen cycles 320 in which the pen 100 may transmit a beacon ("B") 323. For example, the series of pen cycles 320 may have a certain cycle time or duration, such as but not limited to 15 msec, and may include a plurality of pen cycles, such as but not limited to pen cycles 322, 324, 326, 328, 330, 332, and/or 334. Beacon 323 may have a fixed relative location within each of the pen cycles 320, and so beacon 323 may be transmitted at fixed intervals.

Beacon 323 may be received and tracked by digitizer 200 to synchronize the digitizer 200 with the pen 100. In some cases, beacon 323 may be used by digitizer 200 as a positioning signal for locating and tracking the pen 100 and/or pen interactions with respect to the digitizer 200 or digitizer sensors 212, as described above in reference to FIG. 2.

For example, as in FIG. 3, digitizer 200 may be in an initial pen search mode 300 that includes a series of touch cycles 360 each having one or more pen search windows 363 for detecting presence of the pen 100. For instance, the touch cycles 360 are time durations the digitizer 200 uses to detect inputs, including inputs received by touch (e.g., finger 204 in FIG. 2) or inputs from pen 100. For example, in some cases, the touch cycles 360 may include a first set of touch cycles 380 and a second set of touch cycles 382, each having different pen search window configurations (e.g., the location of one or more pen search windows 363 within a respective cycle) in order to improve chances of detecting the beacon 323 transmitted by the pen 100. The digitizer 200 may initiate the initial pen search mode 300 upon initially being powered on, and/or a certain time period after contact with the pen 100 is lost (or not present).

During the initial search mode 300, digitizer 200 may perform a search for the signal, e.g., beacon 323, transmitted by the pen 100. For example, to perform the search, the digitizer 200 may tune a receiver to one or more frequencies over which pen 100 may transmit signals, e.g., beacon 323, and may listen for such signals for some duration of time before tuning to a next frequency. For instance, digitizer 200 may perform one or more pen searches during one or more pen search windows 363 in each of the touch cycles 360. For instance, multiple pen search windows 363 are shown in each of the touch cycles 360. The touch cycles 360 may have a fixed time period, which may vary. For example, digitizer 200 may configure the touch cycles 360 during the initial pen search mode to have a time duration such as but not limited to 10 msec. Although, the duration of the touch cycle in this example is 10 msec, digitizer 200 may perform a search for the signal from the pen 100 only during some portions of each of the touch cycles 360. For instance, digitizer 200 may search for a signal (e.g., beacon 323) from the pen 100 during one or more of pen search windows 363 of touch cycle 362 as other portions of each of the touch cycles 360 may be used by the digitizer 200 to perform other operations (e.g., to detect touch, to perform processing, etc.).

Ultimately, in most cases where pen 100 is transmitting the beacon 323, the cycle time (e.g., 10 msec) of the touch cycles 360 and the varying locations of the pen search windows 363 may align with the periodic beacon 323 in the different cycle time (e.g., 15 msec) of the pen cycles 320. For example, in FIG. 3, pen search window 363 in touch cycle 362 aligns with beacon 323 transmitted from the pen 100 during pen cycle 324. The alignment of pen search window 363 and beacon 323 during a first touch cycle (e.g., touch cycle 362) of the digitizer 200 is shown for illustration purposes, but it should be understood that the digitizer 200 may have to perform the search during multiple touch cycles 360 before the pen search window 363 of one of the touch cycles 360 of the digitizer 200 is aligned with the beacon 323 in one of the pen cycles 320 of the pen 100.

For instance, in an example where pen 100 is not active until pen cycle 326 (i.e., no transmission of beacon 323 until pen cycle 326), digitizer 200 may perform a search for a signal transmitted from the pen 100 during touch cycles 364, 366, 368, 370, and 372, continuing to search until the pen search windows 363 in touch cycle 374 of the digitizer 200 align with the beacon 323 transmitted from the pen 100 in pen cycle 332. As a result, in this example, digitizer 200 may not be able to synchronize with the pen 100 until after touch cycle 374, which may cause digitizer 200 to miss information from the pen 100 and cause a user to feel as if the pen 100 is not reacting correctly and/or timely to the user inputs.

Although, FIG. 3 illustrates continuation of the initial search mode after the digitizer 200 finds the beacon 323 from the pen 100, it is for ease of illustration, and it should be understood that the digitizer 200 enters a synchronization mode and then the tracking mode. Specifically, once digitizer 200 finds the beacon 323, digitizer 200 may perform synchronization with the pen 100 in order to closely align subsequent pen search windows with subsequent beacons 323. After successful synchronization of the digitizer 200 with the pen 100, digitizer 200 may transition to the tracking mode having a touch cycle duration that matches the duration of the pen cycle 320, e.g., 15 msec, so that the touch cycle of the digitizer 200 is aligned with the pen cycle 320 of the pen 100.

Thus, the initial pen search mode described above, where the digitizer 200 typically utilizes multiple touch cycles 360 to search for and/or detect the pen 100, is not efficient as some strokes from the pen 100 may be lost (e.g., may not be detected), which may be affect the robustness and/or performance of the digitizer 200. Therefore, there is a need for a more efficient or a fast pen search mode so that the digitizer 200 can detect the pen 100 in less time when compared to the initial pen search mode described above, to minimize and/or eliminate the missing strokes from the pen 100.

Figure 4:
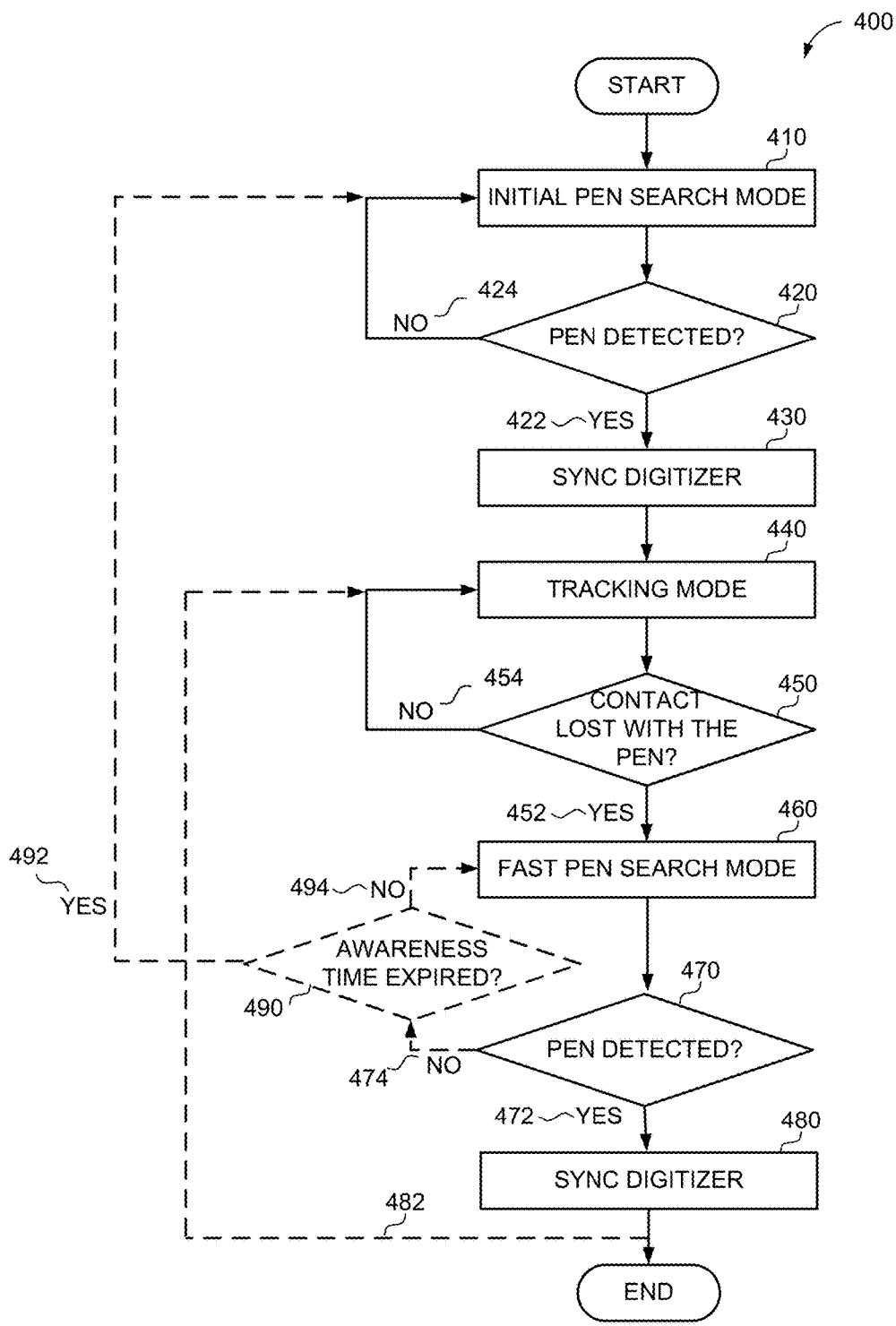
FIG. 4 is a flowchart of an example of a method of a digitizer system performing a fast pen search.

Referring to FIG. 4, a method 400 of performing a fast pen search according to an implementation of the present disclosure utilizes information about one or more previous locations of the beacon 323 of the pen 100 to configure subsequent pen search windows 363 in an effort to speed up detection after losing tracking of the pen 100. For example, the digitizer 200 may include the method 400 in a fast pen search mode that may be implemented within a certain time period after losing tracking of the pen 100.

In an implementation, at block 410, as described above in reference to FIG. 3, digitizer 200 may be in an initial pen search mode and may search for a signal transmitted by pen 100. At block 420, digitizer 200 may determine whether pen 100 is detected. At 422, if the digitizer 200 determines that the pen 100 is detected, then digitizer 200, at block 430, may perform a synchronization procedure to synchronize the digitizer 200 with the pen 100. At block 440, upon completion of the synchronization procedure, digitizer 200 may transition to the tracking mode for maintaining tracking of the pen 100. Optionally, at 424, if the digitizer 200 determines that the pen 100 is not detected, then the digitizer 200 remains in the initial search mode and continues to search for the signal (e.g., beacon 323) transmitted from the pen 100.

Further, the digitizer 200 may continue in the tracking mode as long as the digitizer 200 remains in contact or communication (e.g., continues to detect beacon 323 and/or other commands) with the pen 100.

At block 450, digitizer 200 may determine whether the contact with the pen 100 is lost. At 452, if the digitizer 200 determines that the contact with the pen 100 is lost, then according to the present disclosure, at block 460, the digitizer 200 may execute a fast pen search mode to perform a fast pen search procedure (or an improved search procedure) for detecting the pen 100. The fast pen search mode and procedure, described below in detail in reference to FIGS. 5-10, allows the digitizer 200 to detect the pen 100 in a relatively fast manner (e.g., relatively quickly or in less time when compared to the initial pen search mode and procedure described above in reference to FIG. 3). Optionally, if the digitizer 200, at 454, determines that the contact with the pen 100 is not lost, then the digitizer 200 continues to remain in the tracking mode.

Furthermore, at block 470, digitizer 200 determines whether the pen 100 is detected during the fast pen search mode. At 472, if the digitizer 200 determines that the pen 100 is detected during the fast pen search mode, then the digitizer 200 synchronizes with the pen 100 and, in some cases, the method may end.

Optionally, at 482, the digitizer 200 may transition to the tracking mode at 440 after the successful completion of synchronizing the digitizer 200 with the pen 100.

In an additional or optional implementation, at 474, if the digitizer 200 determines that the pen 100 is not detected during the fast pen search mode, then the digitizer 200, at 490, may determine whether an awareness time threshold, as described in detail below in reference to FIG. 5, has passed or expired. For example, the awareness time threshold may be any value indicative of an amount of time when the pen 100 may still maintain a similar transmission interval for the beacon 323 as was last known by the digitizer 200. In one example, which should not be construed as limiting, the awareness time threshold may be a value such as 1 sec. In other words, after expiration of the awareness time threshold, performing the fast pen search mode and procedure would not be helpful to synchronize the digitizer 200 with the pen 100. So, at 494, when the digitizer 200 determines that the awareness time threshold has not expired, then the digitizer 200 may return to the fast pen search mode at 460. Alternatively, at 492, when the digitizer 200 determines that the awareness time threshold has expired, then the digitizer 200 may return to the initial pen search mode at 410.

Figure 5:
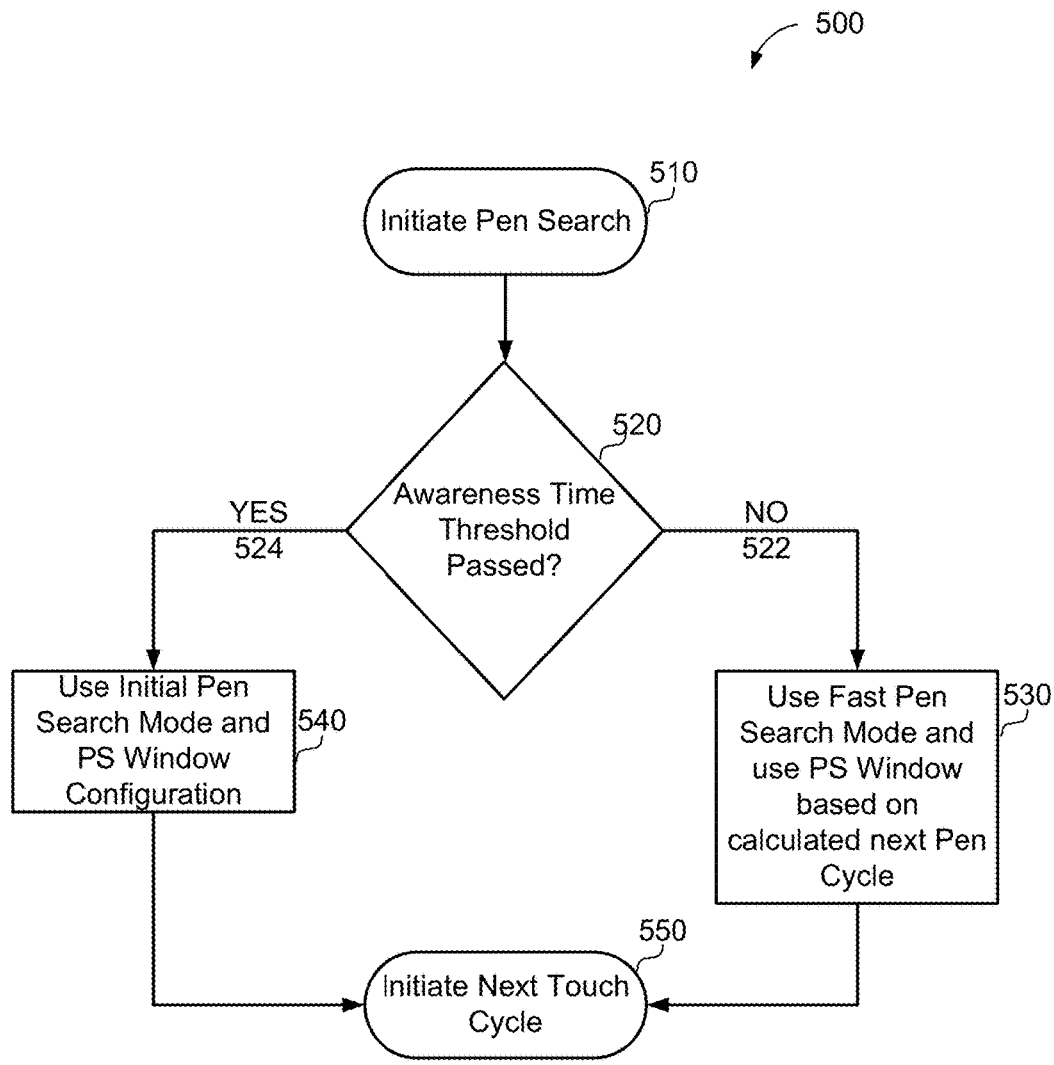
FIG. 5 is a flowchart of an example method for determining whether a fast pen detection method can be used at the digitizer for searching for the pen.

Referring to FIG. 5, an example method 500 for determining whether the fast pen search mode, or the initial pen search mode, can be used by the digitizer 200 to search for the pen 100 takes into account the amount of time since losing tracking of the pen 100 when determining which pen search mode to use.

For example, at block 510, digitizer 200 may initiate a search for the pen 100 in response to losing contact with the pen 100 in the tracking mode. That is, digitizer 200 has previously detected the pen 100, synchronized with the pen 100, and was tracking the pen 100 in the tracking mode. At block 520, digitizer 200 may determine whether a time threshold, e.g., an awareness time threshold, has passed. For instance, digitizer 200 may perform this check to determine whether the fast pen search mode and procedure can be used to search for the pen 100. For instance, the fast pen search mode and procedure may not be an efficient manner of detecting the pen 100 if too much time (e.g., enough time where the beacon 323 transmission time has drifted out of an expected location, such as but not limited to 1 second) has passed since the last contact with the pen 100.

At 522, if digitizer 200 determines that the awareness time threshold has not passed (lesser than or equal to the time threshold value), then the digitizer 200, at block 530, may determine to use the fast pen search mode, computes the location of the next pen cycle and the next beacon 323 based on the last known time location of the beacon 323 transmitted by the pen 100, and configures one or more pen search windows in one or more subsequent touch cycles to align with the next beacon 323. Optionally, digitizer 200 at 522 may further take into account any pen drift (e.g., change in timing due to the clock of the pen 100 and the clock of the digitizer 200 being different when calculating the location of the next pen cycle and the next beacon 323, as described below with reference to method 600 of FIG. 6. At 550, digitizer 200 may initiate the next touch cycle with the configured pen search window(s) and perform the search for the pen 100.

Alternatively, at 524, if the digitizer 200 determines that the awareness time threshold has passed (greater than the time threshold value), then the digitizer 200, at block 540, may use the initial pen search mode having the initial pen search window configuration(s). For example, in this case, the digitizer 200 may utilize the initial pen search mode described above in reference to FIG. 3. Then, at block 550, the digitizer 200 may initiate the next touch cycle with the configured pen search window(s) and perform the search for the pen 100.

Figure 6:
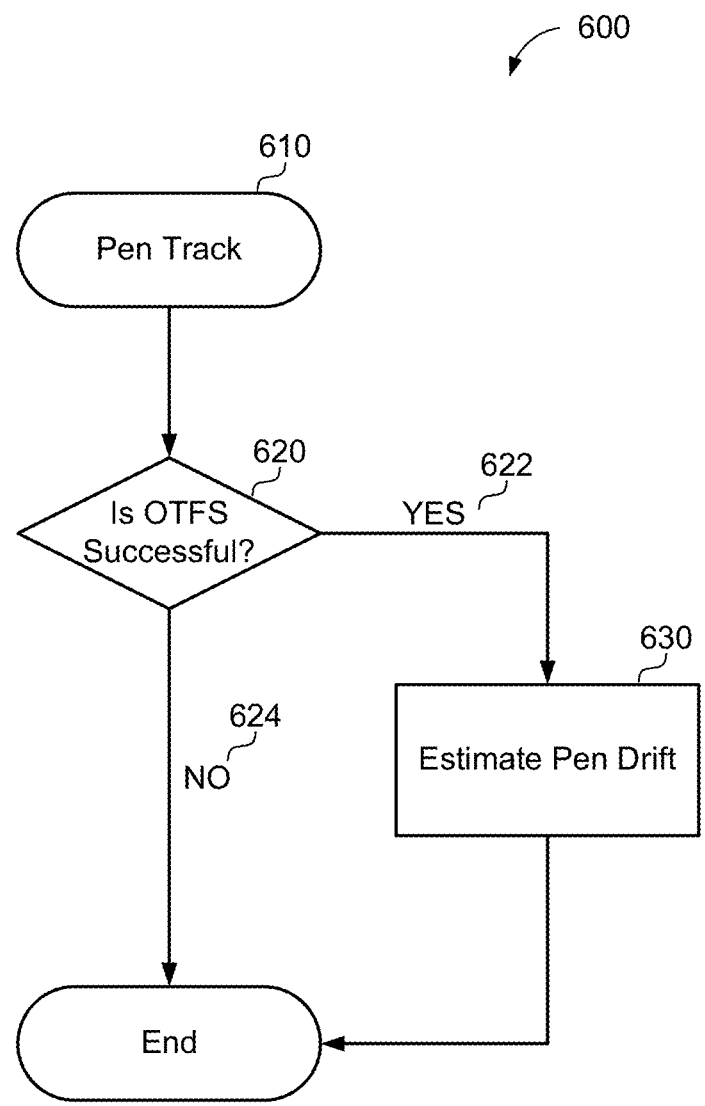
FIG. 6 is a flowchart of an example method of estimating pen draft for the fast pen detection at a digitizer.

Referring to FIG. 6, an example method 600 of estimating pen drift by digitizer 200 may be used to maintain tracking of the pen 100 while in the tracking mode, and/or to improve an estimated location of a subsequent pen cycle 320 and/or subsequent beacon 323 after losing tracking of the pen 100 when configuring pen search windows in the fast pen search mode.

For example, at block 610, digitizer 200 may be in the pen tracking mode. That is, the pen 100 is in contact or in synchronization with the digitizer 200. At 620, the digitizer 200 determines whether an on-the-fly-synchronization (OTFS) procedure is successful. The digitizer 200 performs an OTFS procedure to align the clocks of the digitizer 200 and the pen 100. For example, the OTFS procedure may include the digitizer 200 listening for the beacon 323 from a time before the beacon 323 is expected until a time after the beacon 323 is expected, in a given pen cycle 320, to determine the exact window of time in which the beacon 323 is being transmitted. At 622, if the digitizer 200 determines that the OTFS procedure is successful, then the digitizer 200 estimates a pen drift for use in configuring one or more next touch cycles and/or one or more pen search windows within one or more next touch cycles, and the procedure ends. For example, the pen drift may be defined as a time offset from the previous time location of a beacon 323 transmitted from the pen 100. For instance, pen drift may be computed in increments of 10 micro seconds. At 624, if the digitizer 200 determines that the OTFS procedure is not successful, then no pen drift is utilized for configuring one or more next touch cycles and/or one or more pen search windows within one or more next touch cycles, and the method ends.

Figure 7:
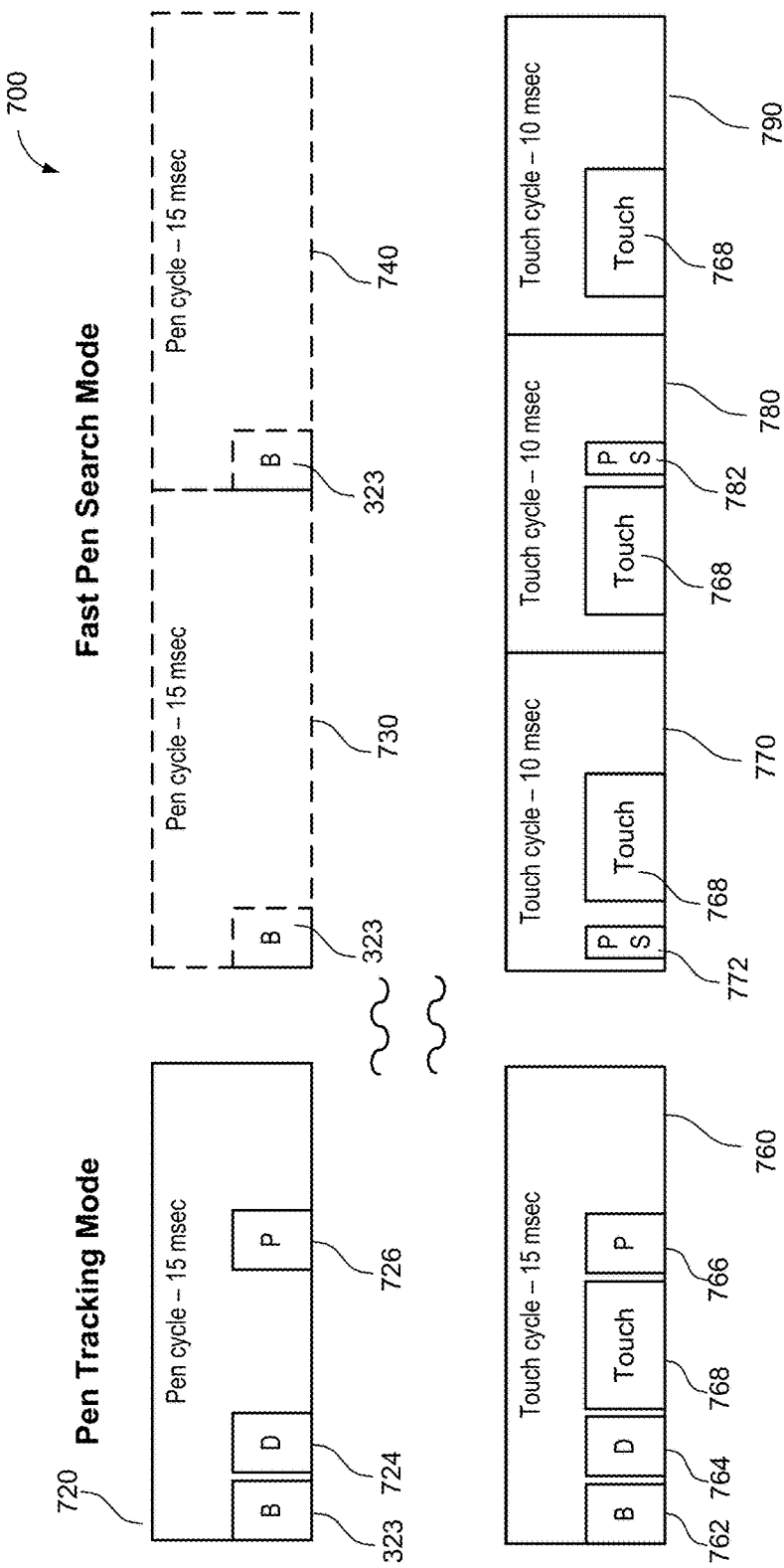
FIG. 7 is a block diagram of a pen cycle of the pen of FIG. 1 and a corresponding touch cycle of the digitizer of FIG. 2 over time for an example transition of the digitizer from a tracking mode to a fast pen search mode according to one implementation of the present disclosure, where the fast pen search mode aligns one or more pen search ("PS") windows with an expected occurrence of one or more subsequent beacon ("B") windows based on prior beacon timing information from the pen tracking mode.

Referring to FIG. 7, an example implementation of mode transitioning 700 of the digitizer 200 includes transitioning from the tracking mode, at touch cycle 760 and pen cycle 720, to the fast pen search mode, at touch cycle 770 and pen cycle 730, after losing tracking of the pen 100. As described above in reference to FIG. 3, the duration of pen cycle and touch cycle are the same when the digitizer is in the tracking mode. For example, in touch cycle 760, this allows digitizer 200 to configure a beacon window 762 aligned to receive beacon 363, a data window 764 aligned to receive digital data ("D") 724 from the pen 100, and a pressure window 766 aligned to receive pressure information ("P") 726 from the pen 100. Also, digitizer 200 may reserve one or more touch windows 768 within touch cycle 760 for performing procedures to detect touch.

When the digitizer 200 loses contact and/or communication with the pen 100, and hence loses synchronization with the pen 100, then the digitizer 200 may use the fast pen search mode and procedure described herein to search for the beacon 323 of the pen 100 at expected future locations (e.g., within expected future pen cycles 730 and 740; these pen cycles are illustrated in dashed lines, as they may or may not occur) based on prior timing information in order to efficiently and quickly detect and synchronize with the pen 100.

For example, in an implementation, digitizer 200 may track and/or store a history of one or more time locations of one or more signals, e.g., beacons 323, from the pen 100 while in the tracking mode. For example, the time location of a previous beacon 323 from the pen 100 may be stored at the digitizer 200, e.g., in a memory at the digitizer 200. When digitizer 200 determines or detects that the digitizer 200 has lost contact and/or communication with the pen 100, then the digitizer 200 may determine (e.g., compute) a location of the next beacon 323 (or one or more subsequent beacons 323) based on at least the last known time location of the last beacon 323 (or based on a history of one or more past locations of one or more past beacon 323). Further, in some examples, the digitizer 200 may further store a history of and take into account the last pen drift or a historical amount of pen drift over time when computing where to expect the one or more locations of one or more subsequent beacons 323 will be. This allows the digitizer 200 to search for the pen 100 at the time computed above, e.g., expected future locations of beacons 323, so that the digitizer 200 can quickly find the beacon 323 from the pen 100. Further, as noted above, the digitizer 200 may transition from the tracking mode to the fast pen searching mode as long as the time since the losing contact or communication with the pen 100 is within the awareness time threshold.

For instance, in an example implementation, digitizer 200 may configure the pen search window 772 during touch cycle 770 of the digitizer 200 to align with an expected beacon 323 in an expected pen cycle 730 of the pen 100, assuming the pen is going to be active and transmitting during a time period corresponding to pen cycle 730. In this example, the digitizer 200 computes the timing of the expected location of the beacon 323 in the expected pen cycle 730 based on one or more previous time locations of one or more beacons, such as last beacon 323 in pen cycle 720, and optionally taking into account the pen drift. As described above with reference to the fast pen search mode in FIG. 4, this alignment of pen search window 772 based on prior beacon timing information improves the robustness and/or performance of the digitizer 200, resulting in a quicker return to the tracking mode (as compared to existing solutions), which may enable the digitizer 200 to reduce or eliminate losing one or more pen strokes.

In a similar fashion, the digitizer 200 may configure the pen search window 782 during touch cycle 780 of the digitizer 200 based on the previous time location of the beacon 323, and, optionally, the pen drift, and align the pen search window 782 with an expected location of subsequent beacon 363 during pen cycle 640. In some cases, the digitizer 200 may only configure pen search window 782 in touch cycle 780 in response to not detecting any beacon in touch cycle 770.

Also, notably, the digitizer 200 may determine to not configure any pen search window in some touch cycles based on the timing information of prior beacons. For example, the digitizer 200 may not configure any pen search windows in touch cycle 790, as the time location of touch cycle 790 is determined to not overlap with an expected location of a subsequent beacon. In particular, digitizer 200 can determine that touch cycle 790 only overlaps with a portion of pen cycle 740 that does not include any expected beacons.

Further, it should be noted that the digitizer 200 in the fast pen search mode may include one or more touch windows 768 for detecting touch within the touch cycles.

Thus, according to the present disclosure, the digitizer 200 may implement the fast pen search mode after losing track of the pen 100 in the tracking mode, where the digitizer 200 in the fast pen search mode may vary a location of one or more pen search windows within each touch cycle to be aligned with an expected location of a beacon based on previously known timing information of one or more prior beacons.

Figure 8:
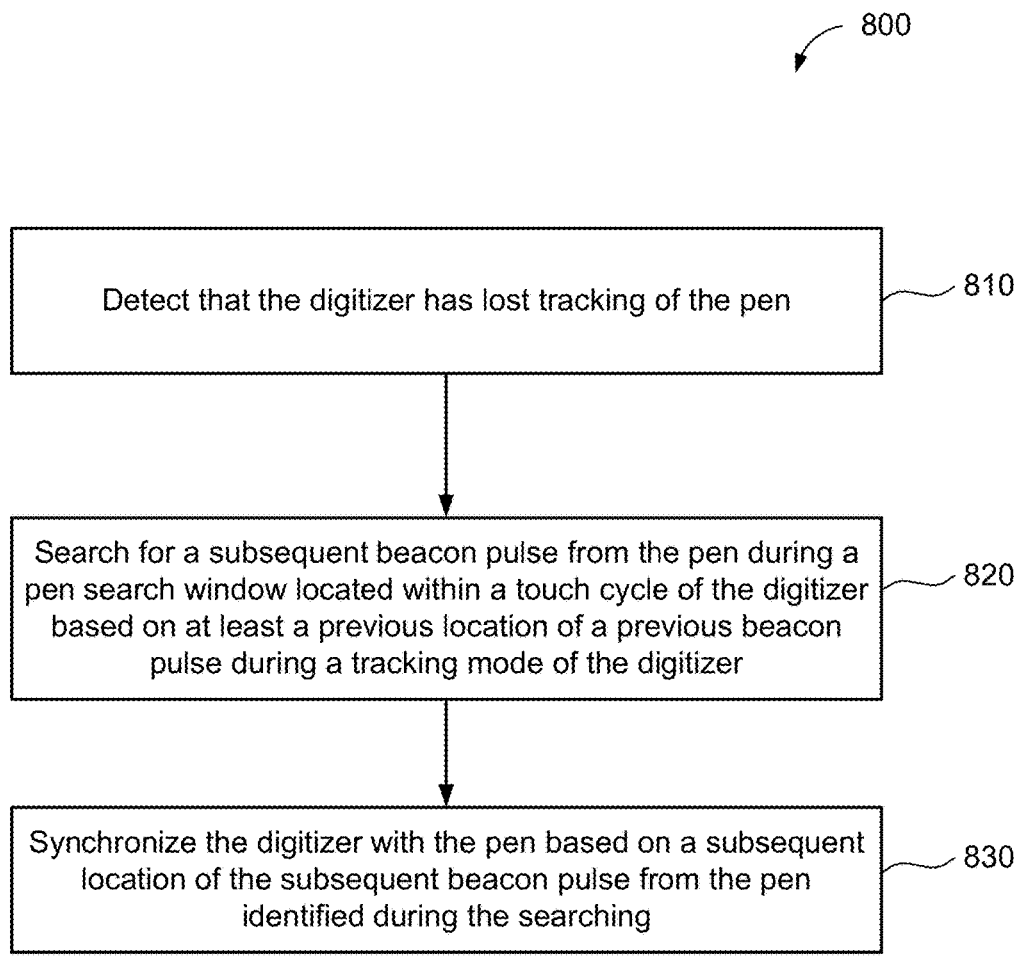
FIG. 8 is a flowchart of an example method of the operation of a digitizer, including a method of synchronizing the digitizer with a pen.

Referring to FIG. 8, an example of one implementation of a method 800 performed by the digitizer 200 for executing a fast pen search mode for detecting and synchronizing with a pen 100 utilizes past beacon information to quickly and efficiently find the pen 100.

For example, at block 810, method 800 includes detecting, by the digitizer, that the digitizer has lost tracking of the pen. For example, digitizer 200 may be in a tracking mode wherein the digitizer 200 is in contact/sync/communication with the pen 100. However, the digitizer 200 may detect that the contact or communication with the pen 100 is lost, e.g., based on the sensors of digitizer 200 not detecting any signal from the pen 100. The contact may be lost due to any one of various reasons, e.g., pen 100 moved away from the digitizer 200, problems with the transmission of the signal from the pen 100, or problems with the receiving of the signal by the digitizer 200, etc.

At block 820, method 800 further includes searching, by the digitizer in response to detecting that the digitizer lost tracking of the pen, for a subsequent beacon from the pen during a pen search window located within a touch cycle of the digitizer based on at least a previous location of a previous beacon during a tracking mode of the digitizer. For example, digitizer 200 may search for a subsequent beacon 323 from the pen 100 (e.g., an expected subsequent beacon 323 in an expected subsequent pen cycle 730 of FIG. 7) during a pen search window (e.g., PS 772 of FIG. 7) that the digitizer 200 selectively locates within the touch cycle 770 based on at least a previous location of at least a previous beacon (e.g., beacon 323 in pen cycle 720 of FIG. 7) during the tracking mode of the digitizer 200. In other words, the digitizer 200 may search for future beacons 323 expected to be transmitted by the pen 100 at selected timing locations based on one or more previously known locations of one or more previous beacons received from the pen 100 during the tracking mode. This allows the digitizer 200 to align subsequent pen search windows with expected future locations of beacons to find the pen 100 in less time when compared to the procedure of finding of the pen without out the use of previous beacon location (and, optionally, drift) information.

For example, digitizer 200 may align a first pen search window at a first position in a first touch cycle of the digitizer (e.g., PS 772 in touch cycle 770) with a first expected subsequent beacon from the pen (e.g., B 323 in pen cycle 730). In a further additional or optional example, digitizer 200 may align a second pen search window at a second position in a second touch cycle of the digitizer (e.g., PS 782 in touch cycle 780) with a second subsequent beacon from the pen (e.g., B 323 in pen cycle 740), wherein the second position is in a different relative location within the second touch cycle as compared to the first position within the first touch cycle. The aligning of the pen search windows with the location of the expected beacons transmitted from the pen allows for the digitizer 200 find the pen 100 in a fewer number of touch cycles as compared to current solutions that do not utilize prior beacon timing information to configure a relative location of one or more pen search windows within one or more touch cycles during a pen search procedure.

Additionally, for example, digitizer 200 may skip (e.g., not configure) a third pen search window in a third touch cycle of the digitizer (e.g., touch cycle 790) based on the third subsequent beacon of the pen not being aligned with the third pen search window of the digitizer. A third search window is not included (i.e., not configured) in the third touch cycle 790 as the corresponding pen cycle (pen cycle 740) does not include any beacon during the time window of touch cycle 790.

Also, in this example, it should be noted that the digitizer 200 is configured to align, to the extent possible, the touch cycles in the fast pen search mode with the pen cycles. For example, in the case where the pen cycle is 15 msec and the touch cycle is 10 msec, the digitizer 200 will align three touch cycles with two pen cycles, e.g., the start of the first pen cycle and the first touch cycle are aligned, and the end of the second pen cycle and the end of the third touch cycle are aligned.

At block 830, method 800 further includes synchronizing the digitizer 200 with the pen 100 based on a subsequent location of the subsequent beacon 323 from the pen 100 identified during the search. For example, in response to any touch cycle where the digitizer 200 detects beacon 323 in a respective pen search window, the digitizer 200 may switch to a synchronization mode. The synchronization mode may begin in a next touch cycle or a subsequent touch cycle. For instance, in a case where the next touch cycle does not overlap with beacon 323, the digitizer 200 may delay the next touch cycle (in the synchronization mode) until such time that a touch cycle may be aligned with a beacon 323. As such, in the synchronization mode, the digitizer 200 may set up one or more beacon synchronization windows (e.g., which may begin before and end after the window in which the beacon 323 is transmitted) in order to synchronize the digitizer 200 with the pen 100. Further examples of suitable synchronization (or "sync") modes are described with reference to FIGS. 9 and 10.

Figure 9:
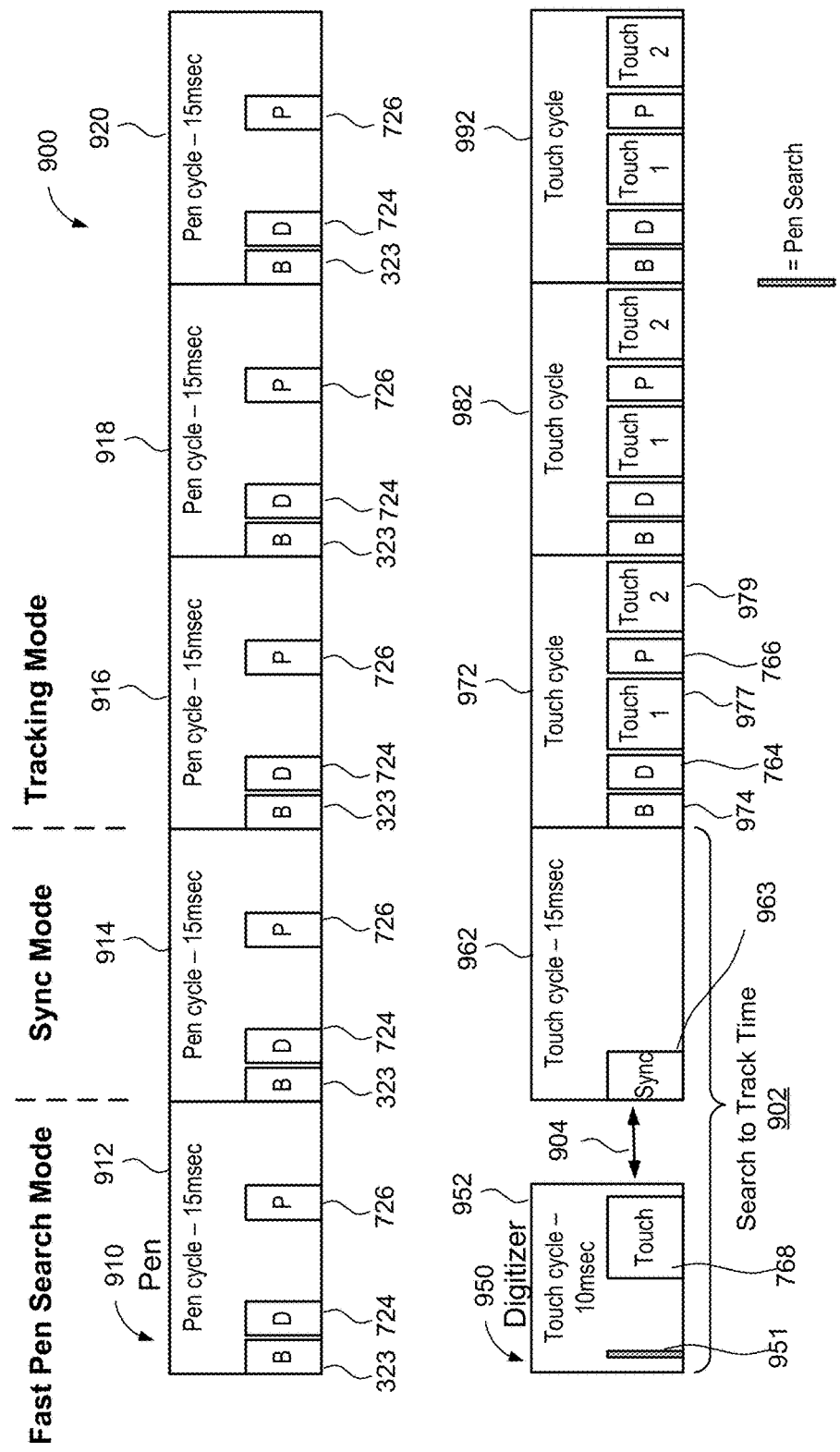
FIG. 9 is a block diagram of a pen cycle of the pen of FIG. 1 and a corresponding touch cycle of the digitizer of FIG. 2 over time, including synchronizing the digitizer with the pen.

Referring to FIG. 9, an example of mode transitioning 900 of the digitizer 200 between fast pen search, sync, and tracking modes is described in accordance with one implementation of the present disclosure.

For example, pen 100 may operate to transmit signals within one or more pen cycles 910, such as pen cycles 912, 914, 916, 918, and/or 920. For instance, in an implementation, each of the one or more pen cycles 910 may have a duration of 15 msec, and may include beacon (B) 323, digital data (D) 724, and pressure information (P) 726. The digitizer 200 may have one or more touch cycles 950 overlapping in time with the one or more pen cycles 910. Each of the touch cycles 950 may have detection windows for detecting input signals, such as from pen 100 or touch inputs from a user. For example, touch 1 window 977 and touch 2 window 979 are windows within touch cycles for detecting pen touches at the digitizer 200. In operation, the digitizer 200 in the fast pen search mode during touch cycle 952 (having a duration of 10 msec) may search in pen search window 951 for beacon 323 transmitted from the pen 100 in pen cycle 912.

Once the digitizer 200 finds the beacon 323, e.g., in touch cycle 952, digitizer 200 may switch to the synchronization mode, changing the touch cycle duration to match the pen cycle duration (e.g., to 15 msec), and may perform a synchronization with the beacon 323 of pen cycle 914 during sync window 963 of touch cycle 962.

After successful synchronization of the digitizer 200 with the pen 100, digitizer 200 may enter the tracking mode as long as the pen 100 is in contact or communication with the digitizer 100. In this example, for instance, the digitizer 200 may be in the tracking mode in touch cycles 972, 982, and/or 992, which align with pen cycles 916, 918, and/or 920, respectively. The amount of time digitizer 200 takes from first detecting the beacon 363 in the fast pen search mode to starting the tracking mode is represented by the search to track time 902, which in this case includes at least one 10 msec touch cycle 952, one 15 msec touch cycle 962 in the sync mode, and some dead time 904 (e.g., 5 msec) in between for a total time of about 30 msec).

Figure 10:
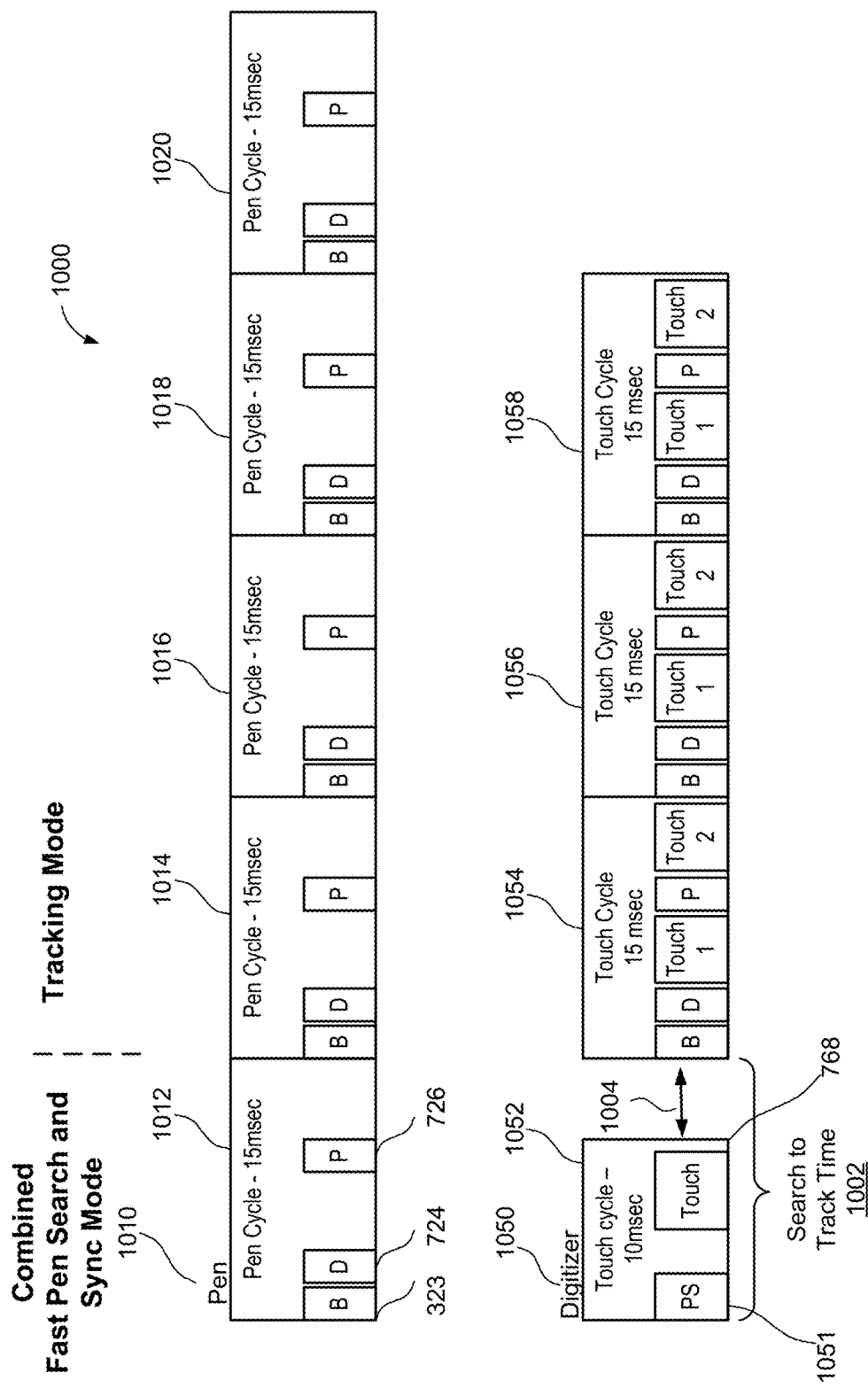
FIG. 10 is a block diagram of a pen cycle of the pen of FIG. 1 and a corresponding touch cycle of the digitizer of FIG. 2 over time, including synchronizing the digitizer with the pen.

Referring to FIG. 10, an additional example of mode transitioning 1000 of the digitizer 200 between a combined fast pen search and synchronization mode and a tracking mode involves a relatively shorter search to track time 1002 based on combining pen detection with pen synchronization, according to an implementation of the present disclosure.

In this case, pen 100 may operate to transmit signals within one or more pen cycles 1010, such as pen cycles 1012, 1014, 1016, 1018, and/or 1020. Further, for example, digitizer 200 may have a plurality of touch cycles 1050, and may configure a relatively larger pen search window 1051 in touch cycle 1052 (as compared to the pen search window 951 in touch cycle 952 of FIG. 9). The relatively larger duration of pen search window 1051 enables the digitizer 200 to search for the beacon pules 323 from the pen 100 and perform synchronization with the pen 100 during the same touch cycle, e.g., touch cycle 1052. For instance, in one implementation, the relatively larger size of the pen search window 1051 enables the digitizer 200 to totally encompass beacon 323 in pen cycle 1012 and simultaneously detect beacon 323 and determine a beginning and end of the window of the beacon 323 in order to synchronize with the beacon 323. This combined search and synchronization procedure may eliminate the need for a separate synchronization mode and a separate synchronization window (e.g., the sync window 963 during touch cycle 962 of FIG. 9) to perform synchronization with the pen 100. Additionally, the combining of the synchronization with the fast pen searching reduces the time before the digitizer 200 transitions to the tracking mode resulting in improved robustness/performance of the digitizer due to less lost strokes. For instance, in this example, the search to track time 1002 only includes at least one 10 msec touch cycle 1052 and some dead time 1004 before the first touch cycle 1054 in the tracking mode.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various implementations are described herein in connection with a device (e.g., computer device 10), which can be a wired device or a wireless device. Such devices may include, but are not limited to, a gaming device or console, a laptop computer, a tablet computer, a personal digital assistant, a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a computer device (such as, but not limited to, a game console). In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with implementations disclosed herein.

What is claimed is:

1. A method of synchronizing a digitizer with a pen, comprising:
   detecting, by the digitizer, that the digitizer has lost tracking of the pen;
   searching, by the digitizer in response to detecting that the digitizer lost tracking of the pen, for an expected subsequent beacon from the pen during a pen search window located within a touch cycle of the digitizer based on at least a previous time location of a previous beacon during a tracking mode of the digitizer; and synchronizing the digitizer with the pen based on a subsequent time location of the expected subsequent beacon from the pen identified during the searching.

2. The method of claim 1, further comprising:
aligning a first pen search window at a first time position in a first touch cycle of the digitizer with a first expected subsequent beacon from the pen; and
aligning a second pen search window at a second time position in a second touch cycle of the digitizer with a second expected subsequent beacon from the pen, wherein the second time position is in a different relative time location within the second touch cycle as compared to the first time position within the first touch cycle.

3. The method of claim 2, further comprising:
determining a misalignment exists between a third pen search window in a third touch cycle of the digitizer and a third expected subsequent beacon of the pen; and
excluding the third pen search window from the third touch cycle based on the misalignment.

4. The method of claim 1, further comprising:
aligning a first set of touch cycles of the digitizer to start and end respectively at a same start time and a same end time of a first set of transmission cycles of the pen.

5. The method of claim 4, further comprising: aligning respective pen search windows within respective touch cycles with one or more subsequent time locations of one or more expected subsequent beacons, including: determining a relative time position of respective pen search windows within each touch cycle of a first subset of the first set of touch cycles, and excluding a respective pen search window within at least one touch cycle of a second subset of the first set of touch cycles.

6. The method of claim 1, further comprising: determining whether an awareness time threshold has passed since detecting that the digitizer has lost tracking of the pen; wherein searching for the expected subsequent beacon during the pen search window time located within the touch cycle of the digitizer based on at least the previous time location of the previous beacon within the tracking cycle of the digitizer is in response to determining the awareness time threshold has not passed, and further corresponds to a fast search mode; and executing a search mode having at least two sets of search cycles, each having different relatively time located pen search windows within each respective search cycle, in response to determining the awareness time threshold has passed.

7. The method of claim 1, further comprising:
determining the subsequent time location of the expected subsequent beacon based on at least a transmission cycle of the expected subsequent beacon associated with the tracking cycle.

8. The method of claim 1, further comprising:
transitioning the digitizer to a search mode in response to losing tracking of the pen, wherein a search cycle of the search mode has a search cycle time less than a transmission cycle time of a transmission cycle of the pen for transmitting the beacon.

9. The method of claim 8, further comprising:
transitioning the digitizer to a synchronizing mode having a synchronization cycle time that matches the transmission cycle time of the transmission cycle of the pen for transmitting the beacon.

10. The method of claim 9, further comprising:
transitioning the digitizer to a tracking mode having a tracking cycle time that matches the transmission cycle time in response to completion of the synchronization.

11. The method of claim 1, further comprising: increasing a duration of the pen search window and synchronizing the digitizer with the pen during the increased pen search window.

12. The method of claim 1, wherein detecting that the digitizer has lost tracking of the pen further comprises:
losing synchronization with the pen for more than a time threshold during a tracking mode of the digitizer.

13. A digitizer for synchronizing with a pen, comprising:
a memory; and
a processor in communication with the memory, wherein the processor is configured to:
detect that the digitizer has lost tracking of the pen;
search, in response to detecting that the digitizer lost tracking of the pen, for an expected subsequent beacon from the pen during a pen search window located within a touch cycle of the digitizer based on at least a previous time location of a previous beacon during a tracking mode of the digitizer; and
synchronize the digitizer with the pen based on a subsequent time location of the expected subsequent beacon from the pen identified during the search.

14. The digitizer of claim 13, wherein the processor is further configured to:
align a first pen search window at a first time position in a first touch cycle of the digitizer with a first expected subsequent beacon from the pen; and
align a second pen search window at a second time position in a second touch cycle of the digitizer with a second expected subsequent beacon from the pen, wherein the second time position is in a different relative time location within the second touch cycle as compared to the first time position within the first touch cycle.

15. The digitizer of claim 14, wherein the processor is further configured to:
determine a misalignment exists between a third pen search window in a third touch cycle of the digitizer and a third expected subsequent beacon of the pen; and
exclude the third pen search window from the third touch cycle based on the misalignment.

16. The digitizer of claim 13, wherein the processor is further configured to:
align a first set of touch cycles of the digitizer to start and end respectively at a same start time and a same end time of a first set of transmission cycles of the pen.

17. The digitizer of claim 16, wherein the processor is further configured to align respective pen search windows within respective touch cycles with one or more subsequent time locations of one or more expected subsequent beacons, including being configured to: determine a relative time position of respective pen search windows within each touch cycle of a first subset of the first set of touch cycles, and exclude a respective pen search window within at least one touch cycle of a second subset of the first set of touch cycles.

18. The digitizer of claim 13, wherein the processor is further configured to: determine whether an awareness time threshold has passed since detecting that the digitizer has lost tracking of the pen; wherein the processor is configured to search for the expected subsequent beacon during the pen search window time located within the touch cycle of the digitizer based on at least the previous time location of the previous beacon within the tracking cycle of the digitizer is in response to determining the awareness time threshold has not passed, and further corresponds to a fast search mode; and execute a search mode having at least two sets of search cycles, each having different relatively time located pen search windows within each respective search cycle, in response to determining the awareness time threshold has passed.

19. The digitizer of claim 13, wherein the processor is further configured to:
  determine the subsequent time location of the expected subsequent beacon based on at least a transmission cycle of the expected subsequent beacon associated with the tracking cycle.

20. A computer-readable medium storing computer-executable instructions executable by a processor for synchronizing a digitizer with a pen, comprising:
  instructions for detecting, by the digitizer, that the digitizer has lost tracking of the pen;
  instructions for searching, by the digitizer, for an expected subsequent beacon from the pen during a pen search window located within a touch cycle of the digitizer based on at least a previous time location of a previous beacon during a tracking mode of the digitizer; and
  instructions for synchronizing the digitizer with the pen based on a subsequent time location of the expected subsequent beacon from the pen identified during the searching.

* * * * *